United States Patent [19]

Uno et al.

[11] Patent Number: 5,557,395

[45] Date of Patent: Sep. 17, 1996

[54] OPTICAL DEVICE FOR MEASURING SPEED

[75] Inventors: Tetuya Uno; Junichi Takagi; Yasunobu Sakai, all of Kyoto, Japan

[73] Assignee: Omron Corporation, Japan

[21] Appl. No.: 141,644

[22] Filed: Oct. 27, 1993

[30] Foreign Application Priority Data

Mar. 15, 1993 [JP] Japan .................................. 5-081478
Oct. 27, 1993 [JP] Japan .................................. 4-312813

[51] Int. Cl.⁶ .................................. G01P 3/36; B60T 7/16
[52] U.S. Cl. .................................. 356/28; 180/169
[58] Field of Search .................................. 356/28; 180/169

[56] References Cited

U.S. PATENT DOCUMENTS

| 3,865,487 | 2/1975 | Andermo | 356/28 |
| 3,888,589 | 6/1975 | Swift | 356/28 |
| 3,994,583 | 11/1976 | Hutchins | 356/28 |
| 4,961,643 | 10/1990 | Sakai et al. | 356/28 |

FOREIGN PATENT DOCUMENTS 1249302 10/1971 United Kingdom ...................... 356/28

*Primary Examiner*—Stephen C. Buczinski
*Attorney, Agent, or Firm*—Klima & Hopkins, P.C.

[57] ABSTRACT

A device for measuring the speed of an object. The device includes a spatial filter scheme to provide quick-response photodetectors and an efficient use of light. The device projects light onto the object by a light source 1, and the light reflected by the object is received by a lens. This light passes through aperture stop 4 and strikes prism array 7, where it is split alternately into two paths at a fixed pitch with respect to the optical axis. The two split beams are received respectively by two photodetectors. The speed of the object moving relative to the measuring device can be calculated based on the data collected by photodetectors.

48 Claims, 12 Drawing Sheets

DIRECTION OF MOVEMENT

OPTICAL DEVICE FOR MEASURING SPEED

FIELD OF THE INVENTION

This invention relates to a device for measuring the speed of an automobile or other vehicle without physical contact by means of a spatial filter consisting of prisms. More specifically, it relates an optical system for this purpose.

BACKGROUND OF THE INVENTION

Devices using spatial filtering schemes are well known in the prior art for measuring the speed of automobiles and other vehicles without physical contact. An example of an optical system used in such a device is described in Japanese Patent Publication, Kokai 52-143081. In this device, the light reflected by the object whose speed is to be measured is conducted through a lens to a detector in a spatial filter system. A panel is furnished between the lens and the detector, and the panel has a small aperture at the focal point of the lens.

To minimize the influence of stray light such as sunlight, street lights or tunnel illumination in such optical measurement devices, it is common to use a scheme employing light whose intensity has been modulated by a photoelectric switch, especially high-speed modulated light.

However, for its photodetector, this type of existing optical system uses a comb tooth-type photodiode to serve the function of a spatial filter. This type of photodiode has a large surface area. Accordingly, the response speed of the light receiving device is slow. For this reason, such a photodiode responds poorly to modulation imposed on the sources at the sites of emission. Another problem is the relatively high cost of the required photodetectors.

One effective way to improve the response time of the photodetector is to combine a purely optical spatial filter with a high-speed photodetector. One example of a device using a purely optical spatial filter can be found in Japanese Patent Publication 58-2662, which describes a speedometer employing a prism-type spatial filter. The spatial filter in this speedometer consists of a laminated prism. The light from the object whose speed is to be measured enters this prism. However, in this device the light is widely diffused when it exits the prism making it difficult to channel it efficiently to the photodetectors. Thus, the efficiency with which the light from the sources can be utilized is poor.

Another example of an existing spatial filter using a prism array is the filter described in Japanese Patent Publication 62-133164. This type of spatial filter uses a prism array constructed by stacking a number of prisms or columnar lenses, and is thus laborious to manufacture with acceptable precision. This filter also suffers a loss in the quantity of light received due to the scattering of light caused by reflections off the refracting surfaces. Furthermore, the ratio of the period of the aperture to its width is not restricted, so it inevitably becomes 2:1. In contrast, the ratio of transmitting to non-transmitting components in an aperture restriction device is 1:1. The light pattern develops components at the third and higher order harmonics of the spatial frequency causing an unfavorable SN ratio.

An existing speed sensor which uses polarized light is described in Japanese Patent Publication 63-190957, as part of a scheme to prevent mistakes in detection when the object in question is submerged. However, with this type of sensor it is necessary to have the light strike the surface of the water at the Brewster angle so as to minimize reflective loss. For this reason the light source and the receptor unit must be kept well apart, which results in a relatively large measurement device.

In addition to these problems relating to the prior art devices, the optical systems used in existing speed sensors would be difficult to install in an optical system of a compact sensor device.

SUMMARY OF THE INVENTION

The present invention was developed to address the problems with the prior art devices as described above.

An object of the present invention is to provide a device to measure speed, which employs a spatial filter featuring a prism array.

Another object of the present invention is to provide a device to measure speed, which employs a spatial filter featuring a prism array that can be manufactured at low cost with acceptable precision.

A further object of the present invention is to provide a device to measure speed, which employs a spatial filter featuring a prism array that can provide a good response time of the photodetector unit, and have an improved efficiency in the manner light can be utilized over the prior art devices.

An even further object of the present invention is to provide a spatial filter-type device to measure speed, which despite using a luminous element capable of being modulated at high speed, can accurately measure speed, can eliminate or reduce inaccuracies due to the effect of stray lights and maintain a high degree of accuracy in its measurements even if the distance between the device and the object should vary.

A still further object of the present invention is to provide a compact and low cost spacial filter featuring a mirror array, which is constructed of less parts than a conventional prism array.

In order to achieve the objects stated above, the present invention was developed to provide a spatial filter-type device to measure speed including means to project beams of light on an object whose speed is to be measured, an optical element to separate the light reflected by the aforesaid object alternately into at least two paths at a fixed pitch with respect to the optical axis, and at least two photodetectors to receive the split light beams. The device includes a lens to receive the light reflected by the aforesaid object, and an aperture stop at the focal position of the lens. The light which passes through the aperture stop is made to strike the aforesaid optical element.

An embodiment of a device according to the present invention can include a collimating lens positioned between the aforesaid optical element and the aperture stop to collimate the light which passes through the aperture stop so that it will strike the optical element.

An embodiment of a device according to the present invention can be configured to place the aforesaid optical element in the plane where the image of the object is formed with the aid of the aforesaid light receiving lens and the aforesaid collimating lens.

An embodiment of a device according to the present invention can be configured to have one condenser positioned between the aforesaid optical element and the two photodetectors so that the light beams which have been split alternately into two paths at a fixed pitch with respect to the optical axis by the aforesaid optical element are condensed on the two photodetectors by the single condenser.

An embodiment of a device according to the present invention can include a condenser with a shorter focal length than the aforesaid collimating lens.

An embodiment of a device according to the present invention having the aforesaid means to project a light beam can include a number of light emitting diodes of a type designed for pulse modulation.

An embodiment of a device according to the present invention can have the aforesaid aperture stop consisting of a slit whose narrow dimension is oriented along the direction of movement of the aforesaid object.

An embodiment of a device according to the present invention can have the aforesaid devices configured to project a light beam along the relative path of movement of the aforesaid object on either side of the aforesaid light receiving lens.

An embodiment of a device according to the present invention can have the aforesaid optical element consisting of a prism array lined up alternately at a fixed pitch so that the light emitted by their surfaces travels along paths which are different from the original path of the light.

An embodiment of a device according to the present invention can have the aforesaid prism array arranged that the angles formed by the optical axes of the aforesaid light emitting surfaces with respect to the incident light have the size of a Brewster angle.

An embodiment of a device according to the present invention can include a non-reflective coating provided on the aforesaid prism arrays, applied either to the surface struck by the beam of light or to the aforementioned surfaces from which the beams exit, or on both.

An embodiment of a device according to the present invention can have the aforesaid prism array provided with a mechanism to restrict the aperture in such a way that the ratio of the aperture period to the width of the openings is 3:1, furnished either on the aforesaid surface struck by the beam of light or on the aforesaid surfaces from which the beams exit, or on both.

An embodiment of a device according to the present invention can have the aforesaid prism arrays provided with a device to obstruct the light between every two of the aforementioned surfaces from which the beams are emitted on paths different from the original path of the light beam.

An embodiment of a device according to the present invention can have the aforesaid prism array fashioned out of a single piece of material.

An embodiment of a device according to the present invention can be configured to provide a spatial filter-type device to measure speed employing a luminous element capable of having its intensity modulated as a source to project a light beam on an object whose speed is to be measured. This measuring device has a lens which receives the light reflected by the object and the spatial filter detects the relative speed of the object from the light received by the lens. The lens consists of two sets of lenses, which are positioned so that their focal points coincide. The spatial filter is composed of an optical element which splits the light alternately into at least two paths at a fixed pitch, a set of lenses which condense the beams split by the aforesaid optical element, a panel having at least two aperture stops in the vicinity of the focal point of the set of lenses, and at least two photodetectors to receive the discrete beams which have passed through the aperture stops.

An embodiment of a device according to the present invention can have the two or more aforementioned aperture stops configured narrow with respect to the path of movement of the object, but wide along the orthogonal axis.

An embodiment of a device according to the present invention can have the aforesaid panel containing at least two aperture stops formed from a single plate of metal, which is fastened to a printed circuit board on which the aforesaid photodetectors are fixed and wired.

An embodiment of a device according to the present invention can have the aforesaid panel with an aperture stop positioned between the first and second aforementioned sets of lenses, and configured so that the beams split into at least two paths by the aforesaid optical element are caused to strike only the aforesaid photodetectors.

An embodiment of a device according to the present invention can have a mirror array instead of a prism array so that the optical path can be shortened.

An embodiment of the present invention can be a speed control system equipped with the aforementioned sensor, and an automobile equipped with this speed control system.

In an embodiment of a device according to the present invention, a light beam is projected from the device onto the object whose speed is to be measured. The light reflected by this object passes through a lens and an aperture stop and strikes an optical element. The reflected light is split alternately by the optical element into at least two paths at a fixed pitch with respect to the optical axis. The split beams are received separately by at least two photodetectors. Based on the data collected by these photodetectors, the speed at which an object is moving relative to the device can be calculated.

In an embodiment of a device according to the present invention, a light beam passed through an aperture stop is collimated by a collimating lens and then strikes a photodetector. This prevents the light from being scattered and so improves the efficiency with which the light is used.

In an embodiment of the present invention, the light reflected by the object whose speed is to be measured passes through a light receiving lens and a collimating lens, striking an optical element placed at the position where an image of the object is formed. The reflected light is split alternately by the optical element into at least two paths at a fixed pitch with respect to the optical axis. The split beams are received separately by at least two photodetectors.

In an embodiment of the present invention, the beams split by the optical element alternately into at least two paths at a fixed pitch are condensed onto the photodetector by a condenser. Thus, this beam condensing is simpler than in the prior art devices.

In a embodiment of the present invention, the light reflected by the object whose speed is to be measured passes through a light receiving lens and an aperture stop, and then strikes an optical element. This light is split alternately by the optical element into at least two paths. The split beams are condensed separately onto photodetectors by a condenser whose focal length is shorter than that of the collimating lens.

In an embodiment of the present invention, an infrared light emitting diode of a type designed for pulse modulation is used as a light source. This prevents the system from being affected by stray light, and yields a good SN ratio.

In an embodiment of the present invention, the optical filter is placed on the downstream side of the aperture stop on the path of the beam, which allows it to be made smaller.

In an embodiment of the present invention, light is projected onto the object whose speed is to be measured by light sources which are positioned on either side of the light receiving lens. This arrangement allows the light to be projected into the center of the receptive area on the object as determined by the light receiving lens and the aperture stop, thereby minimizing loss in quantity of light received.

In an embodiment of the present invention, the beams are condensed easily by an optical element.

In an embodiment of the present invention, reflective loss is prevented from occurring at the refractive surfaces of the prism array.

In an embodiment of the present invention, reflective loss of light at the prism array can be reduced.

In an embodiment of the present invention, loss in quantity of light received can be minimized, and the SN ratio can be improved.

In an embodiment of the present invention, the manufacture of the prism array can be simplified.

In an embodiment of the present invention, light is projected by a luminous element whose intensity can be modulated onto an object whose speed is to be measured. This light is reflected by the object, passes through two sets of lenses, and then strikes an optical element. The light is split alternately by the optical element into two paths at a fixed pitch, and is then condensed by a set of lenses. This light becomes the signal component attained by the spatial filter. The light is passed through two aperture stops to reduce its noise component, and then received separately by two photodetectors. The speed of the relatively moving object is calculated based on detection signals from the photodetectors. Because the signal light is passed through aperture stops before reaching the photoreceptor system, photodetectors can be used which have a fast response and a small receptive area.

In an embodiment of the present invention, the noise component of the light which is not needed for the speed measurement can be blocked. Although the aperture stop is wide along the axis orthogonal to the path of the object, this has no effect on the characteristics of the spatial filter. The quantity of signal detected by the wide portion increases, resulting in good sensitivity.

In an embodiment of the present invention, the metal plate can be grounded to the printed circuit board, which allows an electrical shield effect to be obtained.

In an embodiment of the present invention, there is a panel with an aperture stop located between two sets of lenses. This prevents any part of the light split by the optical element from acting as stray light and simultaneously striking more than one photodetector.

In an embodiment of the present invention, the light reflected on an object through the first lens, aperture, and second lens is reflectecd on the mirror array, and then strikes the optical element.

In an embodiment of the present invention, the surface of the mirror array has a number of triangle refractive surfaces which have flat top portions. Since the light reflected on the flat top portion does not reach the optical element, the light is split into two paths precisely.

In an embodiment of the present invention, the second lens and the mirror array are constructed in a single element.

In an embodiment of the present invention, the light which has a specific wave length can be amplified and strike the optical element.

In an embodiment of the present invention, the two optical elements are positioned as closely as possible to avoid optical interference each other.

In an embodiment of the present invention, the first and second lenses are positioned at specific locations in the device where no intercept of the light occurs.

In an embodiment of the present invention, an output from the spatial filter and speed sensor are calculated in a central processing unit ("CPU") to obtain the best brake and acceleration speed of a vehicle.

DETAILED DESCRIPTION OF PREFERRED EMBODIMENTS

Figure 1:
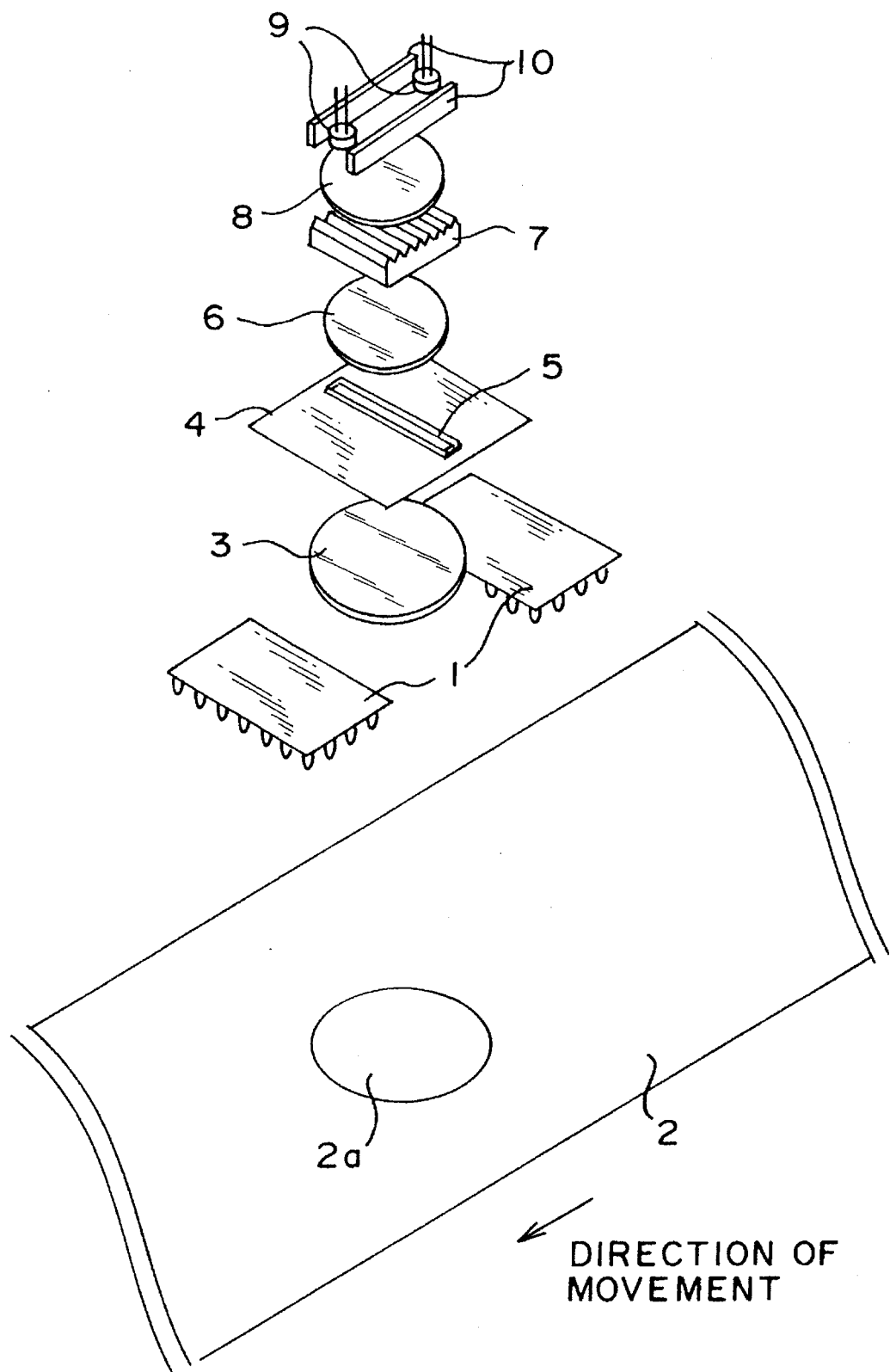
FIG. 1 is an oblique view of a first device to measure speed presented as a first preferred embodiment of the present invention.
Figure 2:
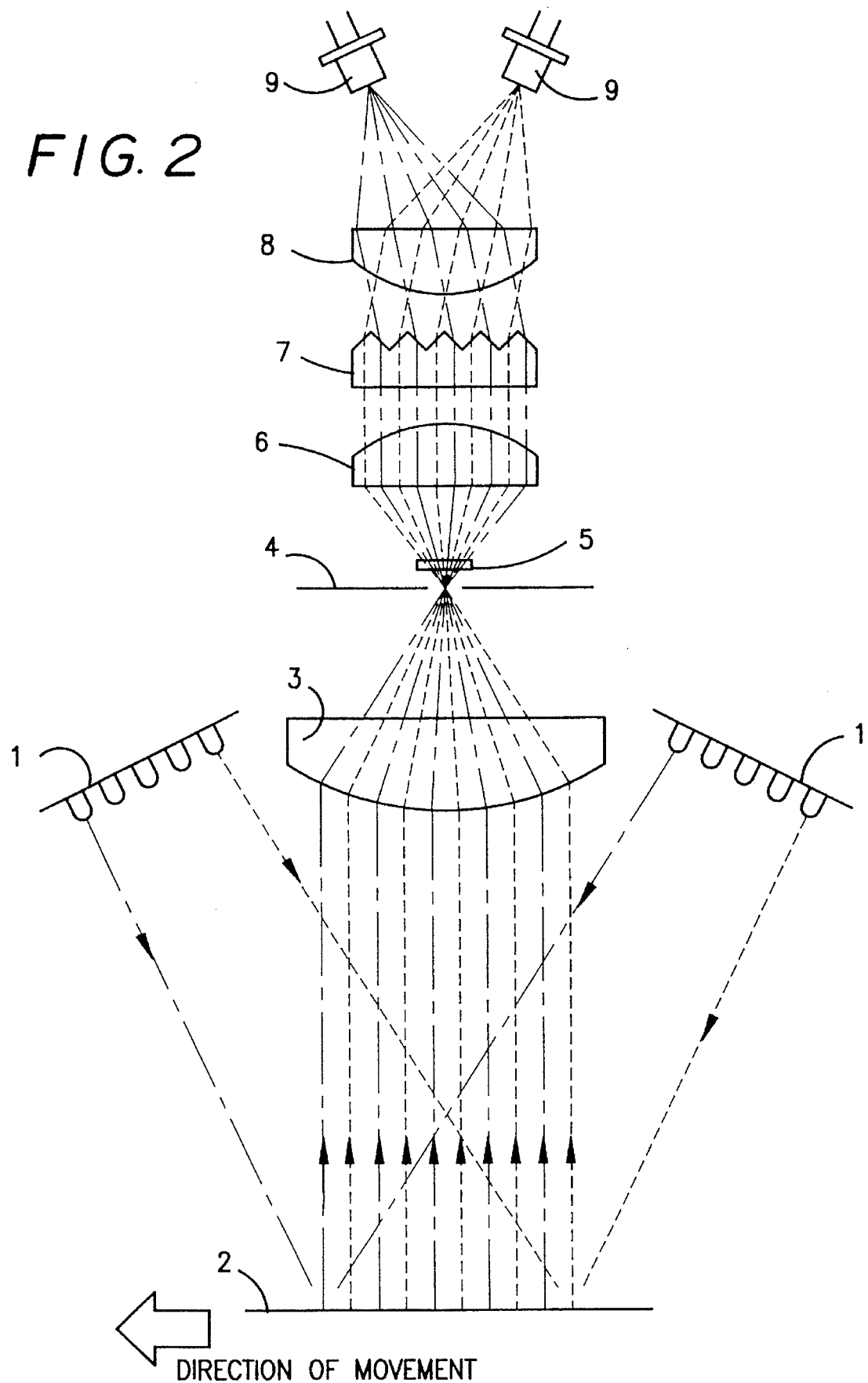
FIG. 2 is a cross-sectional view of the device, as shown in FIG. 1.

The first preferred embodiment of the present invention will now be described with reference to the drawings. FIG. 1 shows an oblique view of a device to measure speed and FIG. 2 shows a cross-sectional view of that same device.

This device comprises two light sources 1 (means to project light) such as light emitting diodes arranged so that they face object 2 whose speed is to be measured and project light onto the object 2; an optical system, which processes the light reflected by the object 2, splits it into two paths, and condenses the split beams; and two photodetectors 9, which receive the light split into two paths.

The aforesaid optical system comprises lens 3 (light receiving lens), which receives the light reflected by object 2; aperture stop 4; optical filter 5, such as either a wavelength selective filter, which passes only light whose wavelength is equal to that of light sources 1, or a scheme employing polarized light using a polarizing filter; lens 6 (collimating lens), which collimates the light passed by aperture stop 4 and optical filter 5; prism array 7 (optical element), which splits the light reflected by object 2 alternately into two paths at a fixed pitch; and lens 8, which causes the split beams to strike photodetectors 9.

The mirrors 10 are arrayed on either side of the two photodetectors 9 to improve condensing efficiency. The aforesaid aperture stop 4 is a slit, which narrows relative to the direction of movement of object 2. The prism array 7 is a pure spatial filter whose light emitting surfaces are arrayed at two alternating pitches, both of which are different from the original path of the light.

The light sources 1 are arranged on either side of lens 3 along the path traversed by the object 2. When the distance between the measurement device and object 2 is at its maximum, the light will be condensed the most. The pitch of the light is fixed with respect to the axis of the reflected light so that it can be projected into the center of receptive area 2a on object 2 as determined by aperture stop 4 and lens 3. In this example, light sources 1 were placed on either side of lens 3, however, it would also be acceptable to have them on one side only.

We shall next explain the operation of the device described above. The light emitted by light sources 1 is reflected by object 2, which is moving relative to the light sources along the path indicated by the arrow in FIG. 1. The lens 3 and aperture stop 4 select only the component of the reflected light which is at a slight angle with respect to the component parallel to the axis of the reflected light. These beams are condensed by lens 3 and pass through aperture stop 4 and optical filter 5. The lens 6 renders them parallel, and they strike prism array 7. The light which strikes prism array 7 is split into parallel beams along one of two paths according to the pitch of the prism it enters.

In FIG. 2, one of the beams now split into two paths is shown as dots and dashes, and the other as a broken line. The two sets of parallel beams are condensed onto the two corresponding photodetectors 9 by the lens 8. The mirrors 10 ensure that the portion of the light which has passed through the long axis of the slit, but has not been condensed by lens 8, will also strike the photodetectors 9.

If V is the velocity V, P the pitch at which the two photodetectors 9 are angled, and m the magnification of the lens, then the attainable frequency f can be found by $f=(m/P)V$. By taking the difference between the outputs from the two photodetectors 9, a periodic signal can be obtained which can be used to detect the speed of object 2 when plugged into a general scheme of the type described in the above cited Japanese Patent Publication 52-143081.

With an optical system having the configuration described above, detectors with a small area can be selected for photodetectors 9, which will result in a better response time. This system can also easily handle modulated light. The gain can be increased in the photo current-to-voltage converter to improve the SN ratio of the circuit system, and the light exiting prism array 7 can easily be condensed.

Figure 3:
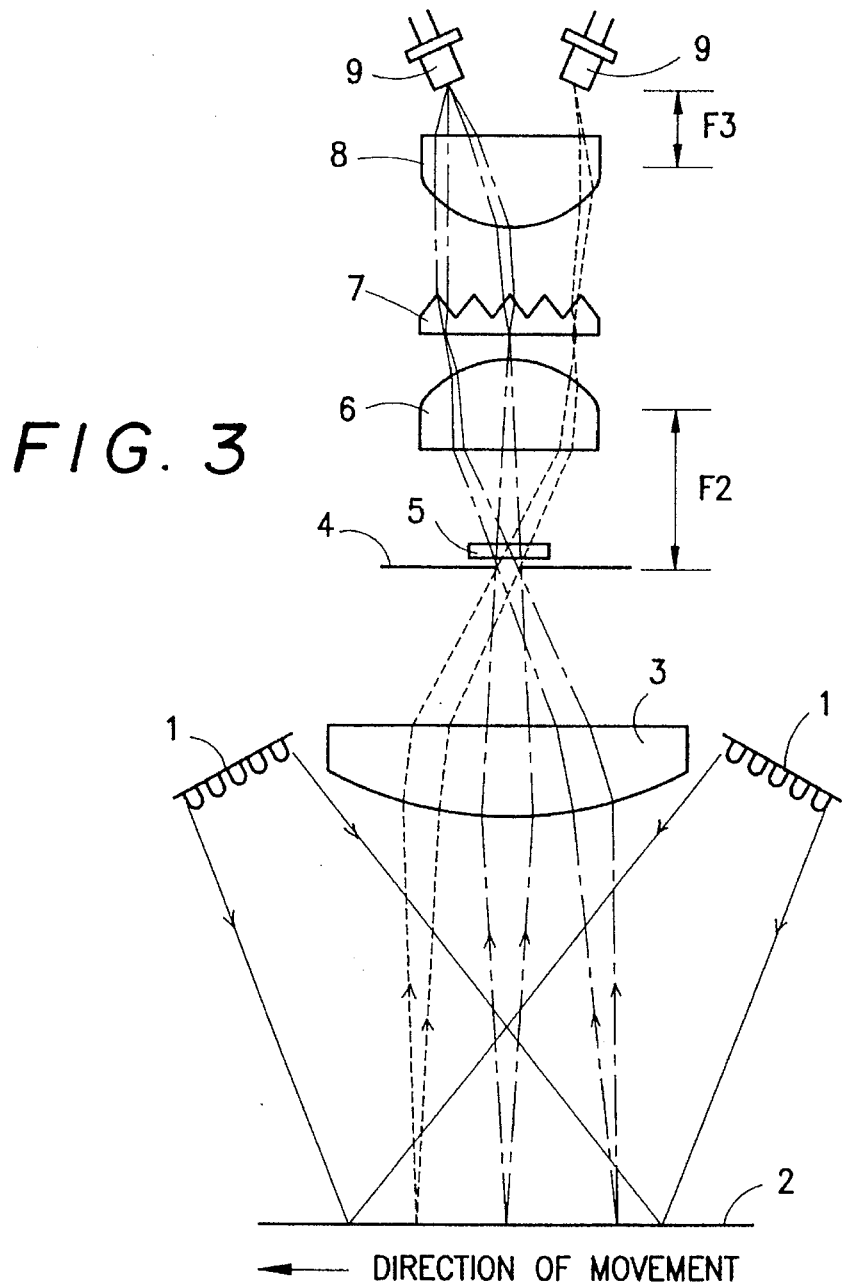
FIG. 3 is a cross-sectional view of a device to measure speed presented as a second preferred embodiment of the present invention.

A second preferred embodiment of the present invention will now be described with reference to FIG. 3. In this device, the object 2 is imaged through the lens 3 (light receiving lens) and lens 6 (collimating lens). The prism array 7 (or an aperture restriction device), which functions as a spatial filter, is placed in the plane where the image is formed. If the distance to the object 2 varies within a given range, the user may choose a distance within that range at which prism array 7 may be placed in the plane where the image is formed by lens 3 (light receiving lens) and lens 6 (collimating lens).

In the configuration described above, the focal length F3 of lens 8 is set so as to be shorter than the focal length F2 of lens 6. The light sources 1 are arranged on either side of lens 3 along the path traversed by object 2. When the distance between the measurement device and object 2 is at its maximum, the light will be condensed the most. The pitch of the light is fixed with respect to the axis of the reflected light so that the light is projected into the center of the receptive area 2a on the object 2, as determined by aperture stop 4 and lens 3.

In this embodiment, light is projected by light sources 1 into the center of receptive area 2a on the object 2. The light reflected by the object 2 is imaged by lens 6 and strikes prism array 7, which is placed at the position where the image is formed. This light is split into two paths by the various prisms which it strikes. The two light beams are condensed by the lens 3, whose focal length F3 is shorter than the focal length F2 of lens 6, onto their respective photodetectors 9.

With this embodiment, we can achieve minimal blurring of the image. The attainable output of the spatial filter is based on the difference in image brightness. The difference in the intensity of the two beams which have been split is maximized, and signal processing is simplified. Because the slit aperture is made relatively narrow and the receptive area of the photodetector on which the image is to be formed is relatively small, the response time is good. Thus, inexpensive photodetectors can be used.

If the object is covered by water, light reflected directly by the surface of the water may pass through the light receiving lens, but this light will be intercepted by the slit aperture so that it does not reach the photodetectors. This will prevent the surface of the water from being detected mistakenly. Even if waves on the surface cause direct reflection in various directions, most of the reflected light will still be intercepted, and the surface will not be detected. At the same time, this device is substantially smaller than examples of prior art devices.

Figure 4:
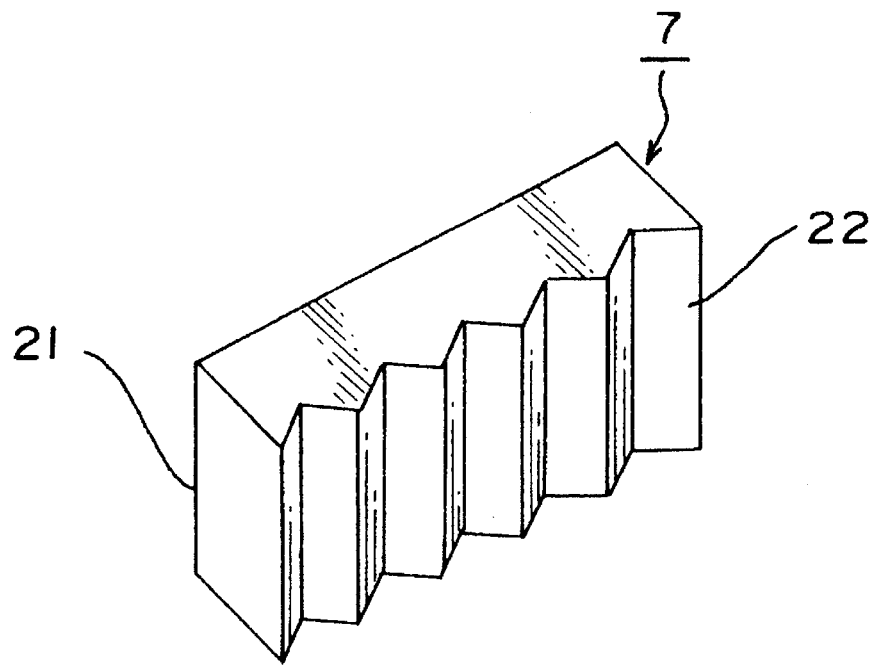
FIG. 4 is an oblique view of a prism array-type spatial filter presented as a third preferred embodiment of the present invention.
Figure 5:
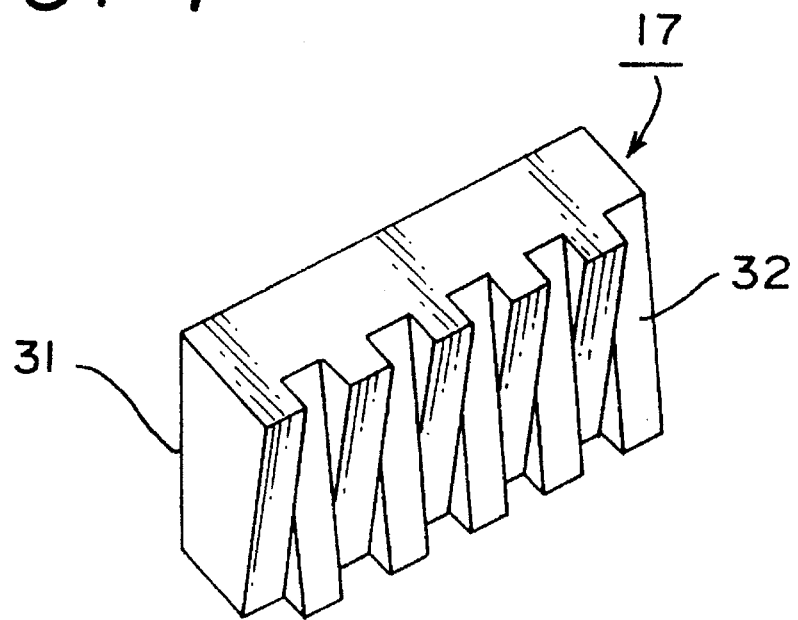
FIG. 5 is an oblique view of a modified third preferred embodiment of a prism array-type spatial filter according to the present invention.

A third embodiment of the present invention including a prism array-type spatial filter will now be described with reference to FIGS. 4 and 5. In both prism array-type spatial filters 7 and 17, light strikes the back surfaces 21 and 31, which have been processed so they are flat. The light exits via refractive surfaces 22 and 32, arrayed at alternating angles. In spatial filter 17, the refractive surfaces 32 are arrayed at alternate angles relative to the base of the filter. The light projected by refractive surfaces 22 and 32 of spatial filters 7 and 17 is converged on one of two points on the opposite surface, which is not pictured. Filters 7 and 17 can easily be manufactured at low cost by molding them as single pieces.

Figure 6:
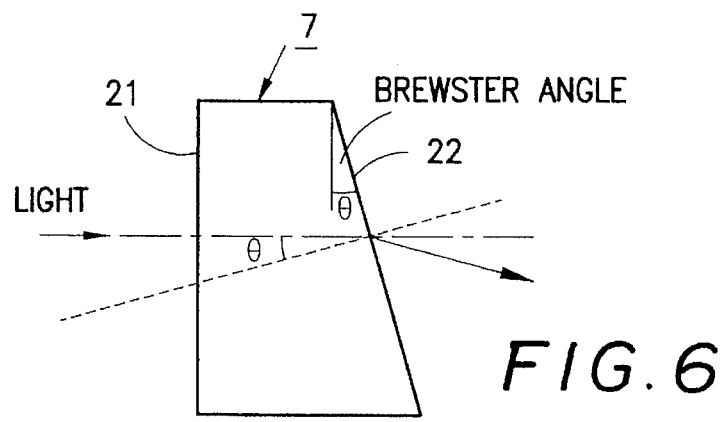
FIG. 6 illustrates the manner in which light is refracted by a prism array-type spatial filter presented as a fourth preferred embodiment of the present invention.

A fourth embodiment of the present invention including a prism array will now be described with reference to FIG. 6.

Among speed sensors using spatial filters, polarized light is often employed in automotive speedometers to prevent the influence of light directly reflected by water standing on the road surface. Such a speed sensor is described in Japanese Patent Publication 63-190957.

In this sensor, the optical element is positioned so that the polarized light P strikes the refractive surface 22 of the prism array-type spatial filter 7. If the filter is fashioned so that angle Θ with respect to the optical axis of refractive surface 22 of spatial filter 7 is the Brewster angle with respect to the polarized light P, reflection will be eliminated and reflected loss at the refractive surface will theoretically go to zero (Brewster's law). For example, if the refractive index of the spatial filter in FIG. 6 is 1.51, then the Brewster angle Θ would be 33.5°. It would also be desirable to apply a non-reflective coating to the surfaces of filter 7 at which the light enters and exits to reduce reflective loss of the light.

Figure 7:
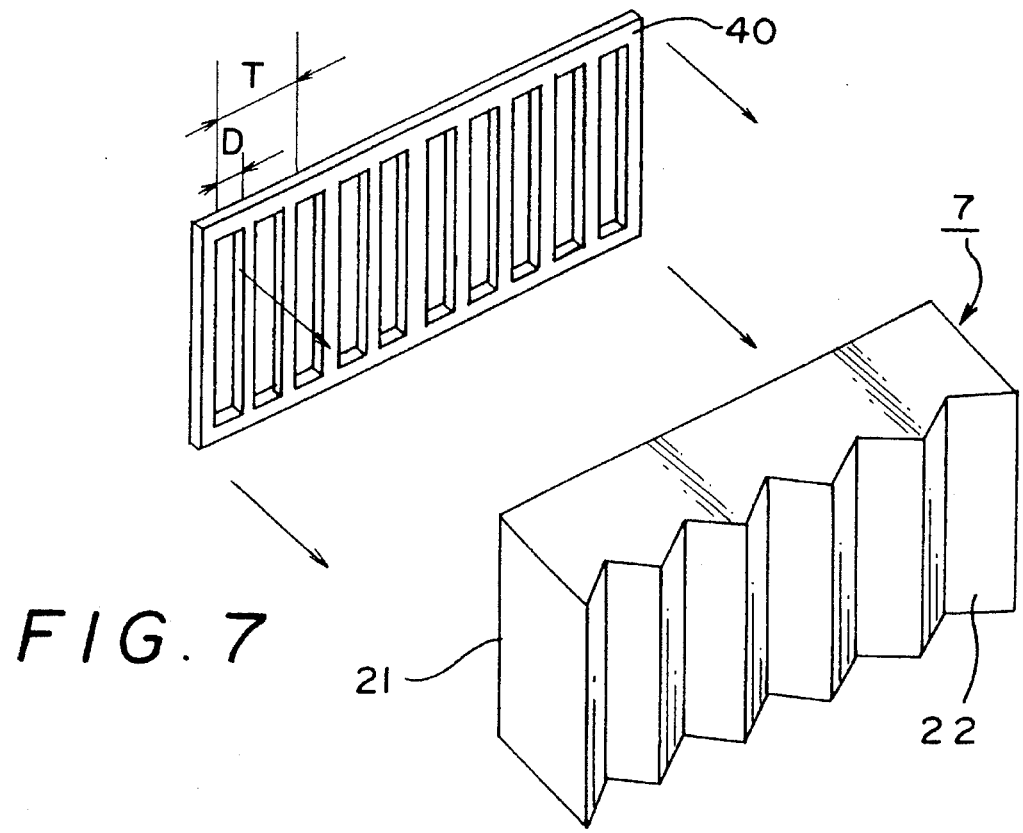
FIG. 7 is an oblique view of a slit panel and a prism array-type spatial filter presented as a fifth preferred embodiment of the present invention.

A fifth preferred embodiment of the present invention including a prism array will now be described with reference to FIG. 7. It is known that a desirable ratio for the aperture period T to the width of the slit D in spatial filter 7 is 3:1. The slits 40, which are affixed to spatial filter 7 in this embodiment, fulfill this condition. The slits 40 can as well be placed on the refractive surfaces 22 of filter 7, or they can be created by applying a metal flash to the rear surface 21.

Figure 8:
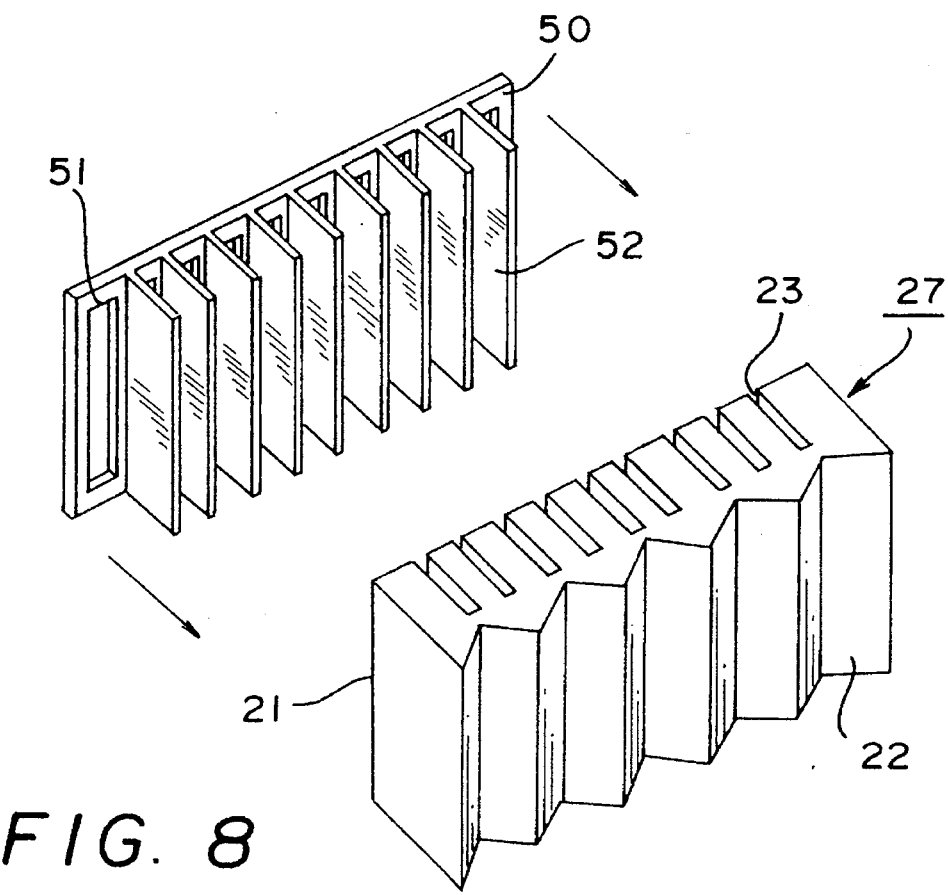
FIG. 8 is an oblique view of another slit panel and prism array-type spatial filter present as a sixth preferred embodiment of the present invention.

A sixth preferred embodiment of the present invention including a prism array will now be described with reference to FIG. 8. In this example, the slit panel 50 is affixed to the spatial filter 27. Located between every two apertures 51 of slit panel 50 is a partition 52, which functions as a blind. On rear surface 21 of filter 27 is cut a series of depressions 23, into which partitions 52 of slit panel 50 engage. This insures that the light which enters any single aperture 51 will be forced to exit via only a single refractive surface 22. The slit panel 50 has the function in this arrangement of reducing higher harmonic noise. To minimize loss due to light being absorbed by partitions 52 in filter 27 and slit panel 50, the partitions can be coated with a mirror surface. This will further improve the efficiency with which the light is transmitted.

Figure 9:
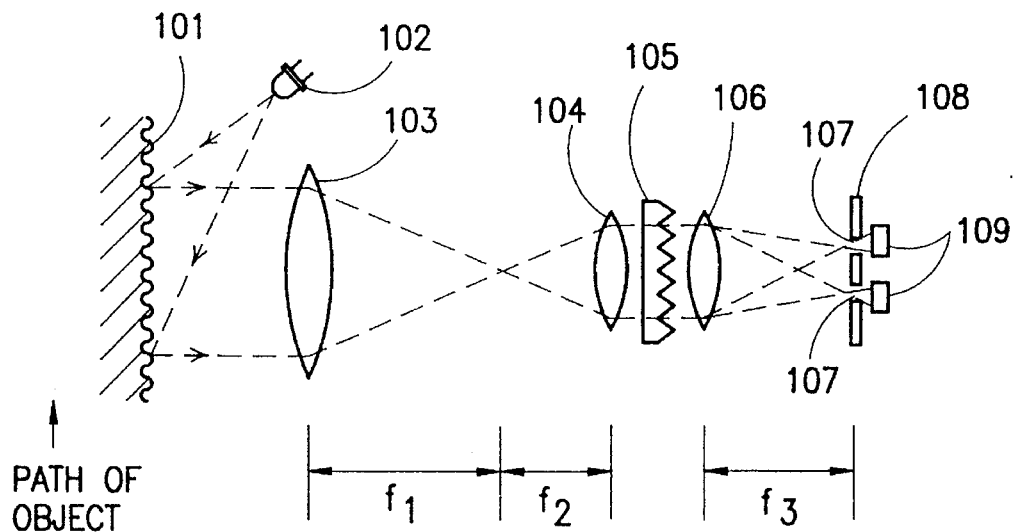
FIG. 9 shows the configuration of a spatial filter-type device for measuring speed presented as a seventh preferred embodiment of the present invention.

A seventh preferred embodiment of the present invention will now be described with reference to FIGS. 9 through 11. In FIG. 9, the configuration of a device to measure speed using a spatial filter is shown. This device comprises the luminous element 102, a semiconductor whose intensity can be modulated, which is placed opposite the object 101 whose speed is to be measured and projects a beam of light onto the object it; a lens 103, which receives the light reflected by object 101; a lens 104, which collimates the light which has passed through lens 103; a prism array 105, the optical element which splits this light alternately into at least two paths at a fixed pitch; a lens 106, which condenses the split beams; a panel 108, which has two aperture stops 107 in it; and two photodetectors 109 to receive the light which has passed through the aperture stops.

If f1 is the focal length of lens 103, f2 that of lens 104, and f3 that of lens 106, then the lenses are placed so that the focal lengths of lens 103 and lens 104 coincide (i.e. so that the distance from lens 103 to lens 104 is equal to (f1+f2)). The panel 108 is placed on the focal point of lens 106 so that the distance from lens 106 to panel 108 is f3.

OPERATION

The operation of a device according to the present invention will now be described.

The light projected by luminous element 102, a semiconductor whose intensity can be modulated, is reflected by the object 101. The reflected light passes through lens 103, is made parallel by lens 104, and strikes prism array 105. The component of the reflected light which is parallel to the optical system receiving the light is demagnified at the ratio of the focal length of the lenses (f2/f1) before striking prism array 105. The light which strikes the prism array is split into two paths by the different prisms the light encounters. The component of the light which is parallel to the optical system receiving it is condensed by lens 106 into the two aperture stops 107 in the focal planes of that lens.

After passing through aperture stops 107, the light is received separately by the two photodetectors 109. The output of the photodetectors 109 is in the form of detectable signals. By obtaining the difference between these signals, a periodic signal can be obtained by means of which the relative speed of object 101 can be calculated. Because the focal lengths of lens 103 and lens 104 coincide, the image magnification of the optical system is determined by the ratio of the focal lengths of the two lenses (f2/f1). Thus, the spatial frequency to be measured is determined unmistakably by the focal lengths of lenses 103 and 104, and the period of the prism array.

The reason for using the panel 108 in which are cut the two aperture stops 107 will now be discussed. The light reflected by object 101 travels along numerous paths. The discrete light reflected by object 101 which passes through lens 103 is split when it exits the various prism surfaces of prism array 105. If no panel 108 is used, the split beams will strike photodetectors 109 provided that they are large enough. If photodetectors 109 to any degree simultaneously detect the beams which are split when they pass through the prism surfaces, the signal obtained as a result of the action of the spatial filter will contain a noise component, and it will be impossible to detect accurately the signal attributable to the spatial filter.

The panel 108 has two aperture stops 107, which are narrow in the dimension corresponding to the path of the object. If, as in this embodiment, such a panel is placed over the two photodetectors 109, the light constituting a noise component can be blocked. The aperture stops 107 severely restrict the light, allow passage of only those components of the reflected light which have exited a single facet of prism 101. If the aperture stop 107 is as narrow as the diffraction region, the optical system will have ideal characteristics. However, when aperture stop 107 is small and the light signal is weak, it is necessary to use luminous elements which emit an intense light and photodetectors which are sensitive enough to detect a weak signal, both of which drive up the cost.

It is therefore desirable to design the system so that the light reflected by a single point on the object will pass through two facets of the prism. In this case, the beam passing through the facets which is required to define a signal component is sufficiently wider than that which constitutes the noise component. For example, if the pitch of the prisms in the prism array 105 is 3 mm, the width of the aperture stops 107 corresponding to the path of the object should be 0.5 mm.

Figures 10A, 10B:
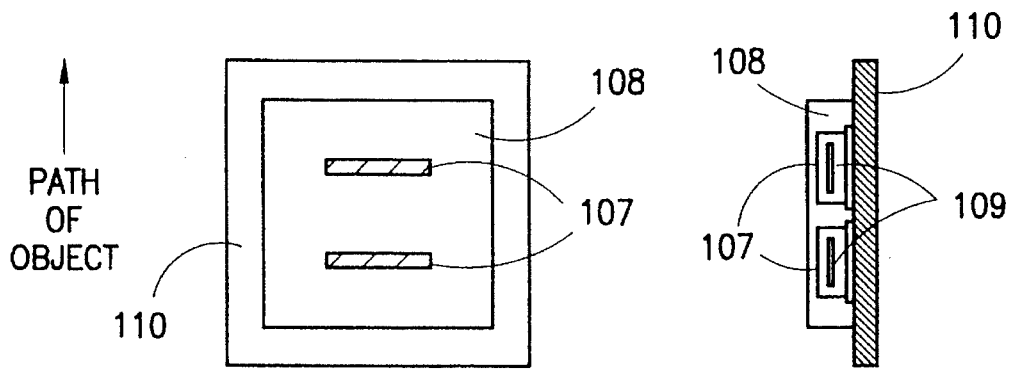
FIG. 10 is a detailed view of the vicinity of the aperture stop in the same device where (a) shows a frontal view and (b) a sectional lateral view.

In FIG. 10, a detailed view of panel 108 is shown formed from a metal plate with two slits in it to serve as aperture stops 107. The panel 108 is attached to printed wiring board ("PWB") 110, on which photodetectors 109 are fixed and wired. The two aperture stops 107 are narrow in the direction corresponding to the path of the object, but wide in the orthogonal direction. When the aperture stops are shaped in this way, most of the light which passes through them will be the component which is nearly parallel to the path of the object. Conversely, an increase in the quantity of the signal can be expected only from the wide portion, that is, the portion from the orthogonal component. Since the panel 108 is fixed to PWB 110, it experiences an electrical shielding effect, resulting in a more favorable S/N ratio in the detected electrical signal. This device detects only the component of the light which is virtually parallel to the path of the object, so its image magnification does not vary. Thus, even if the distance between the measurement device and the object should vary, the quantity of light received will not vary significantly, and the demand on the signal processing circuit will be light.

Figures 11A, 11B:
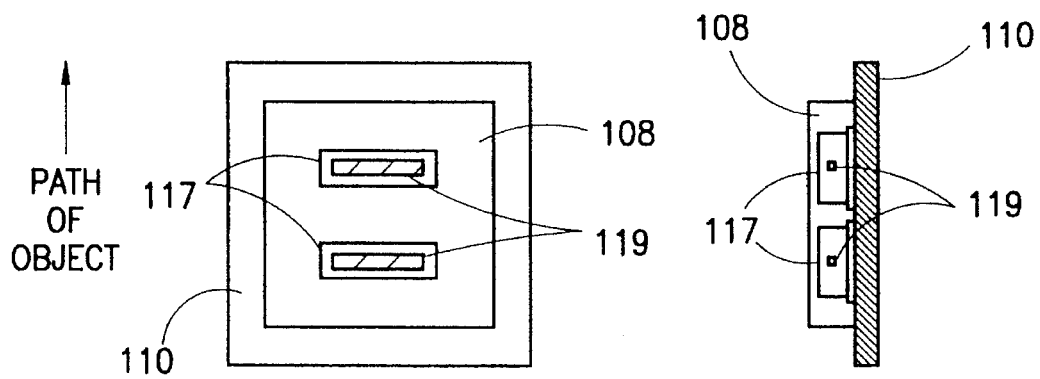
FIG. 11 is a detailed view of the vicinity of the aperture stop presented in an eighth preferred embodiment of the present invention where (a) shows a frontal view and (b) a sectional lateral view.

An eighth embodiment of the present invention is shown in FIG. 11, which is a modification of the panel shown in FIG. 10. The receptive area of each photodetector 119 is made smaller than its aperture stop 117. This arrangement also yields a serviceable aperture stop. The two aperture stops 117 on panel 108 are the same length as the long dimension of photodetectors 109 in FIG. 10. The effect achieved is the same as that of the panel in FIG. 10. In addition, since photodetectors 119 are smaller, their cost is proportionately lower. Using photodetectors with a small receptive area enables rapid handling of modulated light, reduce noise, and improve measurement accuracy.

In the embodiment discussed above, the prism array 105 splits the light into two beams, and lens 106 condenses the beams onto two spots. For this reason, panel 108 is shown as having two aperture stops 107. However, the invention is not limited in this way. The prism array 105 can just as well split the light into three or more beams, in which case panel 108 would have the corresponding number of aperture stops 107, and an equal number of photodetectors 109 would be provided.

Figure 12:
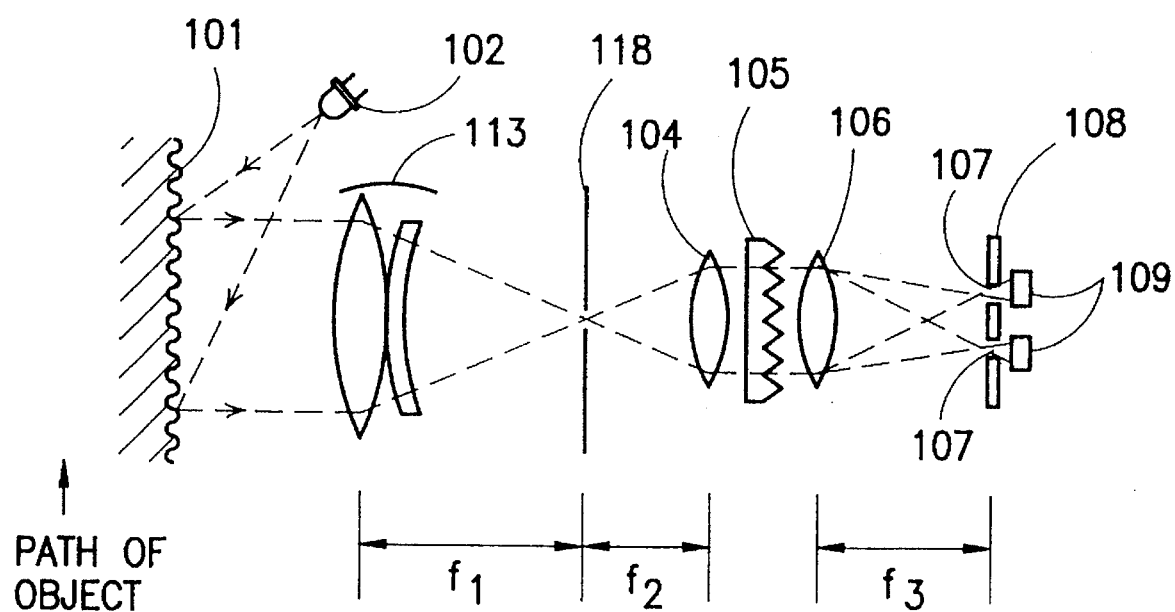
FIG. 12 is a view of the configuration of a spatial filter-type device for measuring speed present as a ninth preferred embodiment of the present invention.

A ninth preferred embodiment of this invention will now be described with reference to FIG. 12. In this example, lens set 113 is defined by a pair of lenses, and a panel 118 with aperture stops is placed between lens set 113 and lens 104 on the common focal point. The purpose of the panel 118 is to prevent any stray light components of the two beams split by prism array 105 from striking more than one of the photodetectors 109. If the beams were to strike multiple elements 109, the signal component would deteriorate and the demand on the signal processing circuit would increase. The panel 118 eliminates this problem.

If a lens with a significant amount of aberration is used, the aberration will cause the light to pass through multiple prism surfaces. In this case, even if the prism array 105 is made to have a fixed pitch, the period of the spatial filter will vary with the distance, resulting in a large measurement error. To minimize aberration, it is desirable to use a lens with a non-spherical surface, however, the larger the outside of the lens becomes, the more difficult it will be to manufacture. In this embodiment, the lens with the greatest outer contour is a spherical lens, but to reduce the aberration, it is used in conjunction with an accessory lens (lens set 113). This minimizes the measurement error and ensures that the accuracy of the measurement will not be impaired.

Figure 13:
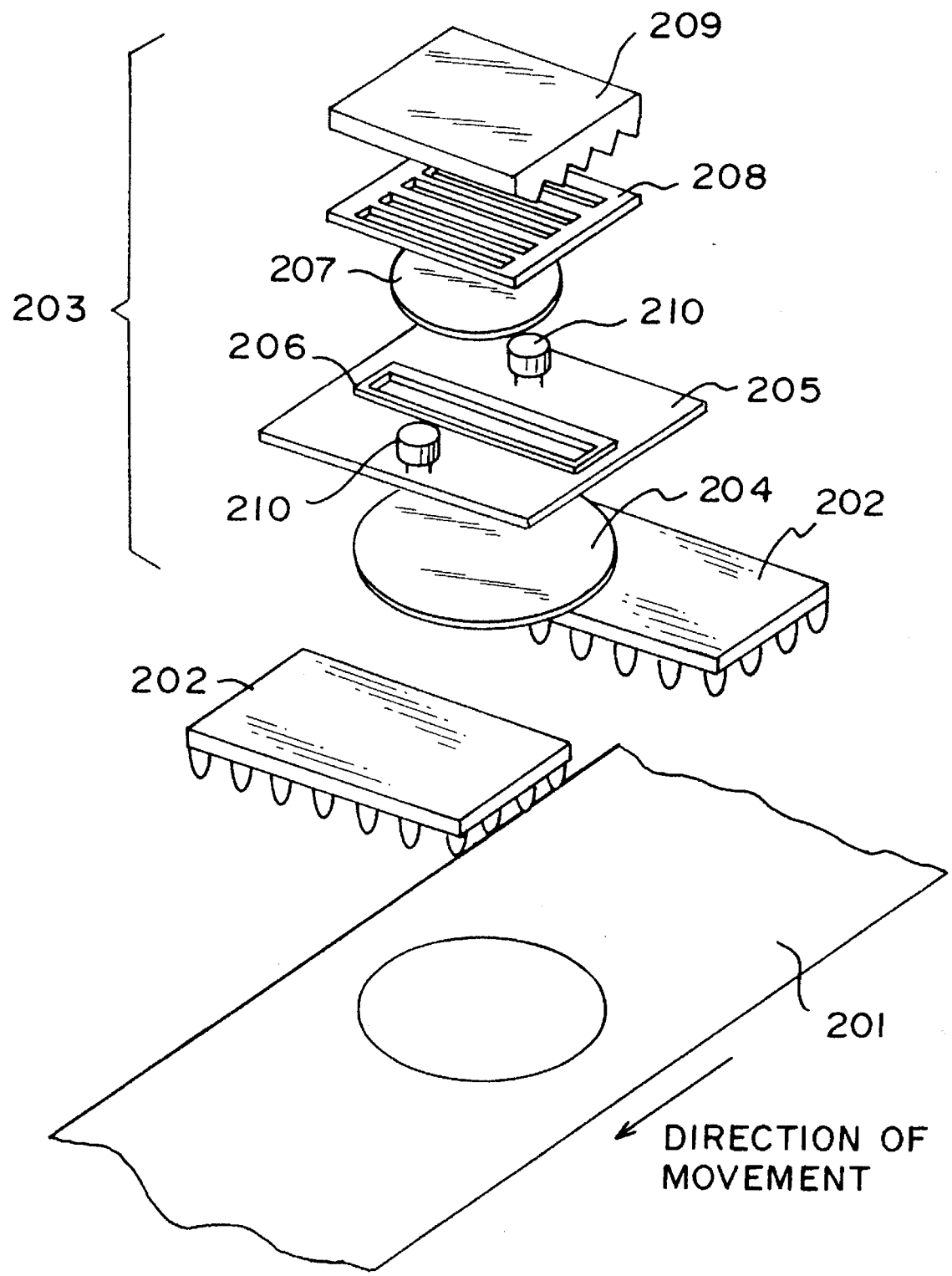
FIG. 13 is an oblique view of the device to measure speed presented as a tenth preferred embodiment of the present invention.

A tenth preferred embodiment of the present invention will now be described with reference to FIGS. 13 and 14. This embodiment includes light source 202 and optical system 203. The optical system 203 comprises a first lens 204 to receive the reflected light from an object 201; an aperture stop 205; an optical filter 206, either a wavelength selective filter which passes only light whose wavelength is equal to that of light source 202, or in a scheme employing polarized light a polarizing filter; a second lens 207 (collimating lens), which collimates the light passed through aperture stop 205 and optical filter 206; a slit array 208, which restricts the collimated light; a mirror array 209, which splits and reflects the light restricted by the slit array; and two photodetectors 210, which receive the light split and reflected on the mirror array.

The aperture stop 205 is a slit which narrows relative to the direction of movement of object 201. The mirror array 209 is triangular relative to the direction of movement, and whose surface is arrayed at two alternating pitches. The surface is coated with thin film which reflects and amplifies specific wavelength light selectively. The two photodetectors 210 are positioned between aperture stop 205 and second lens 207 where the light passed through the aperture is not intercepted in order to make this device compact.

Figure 14:
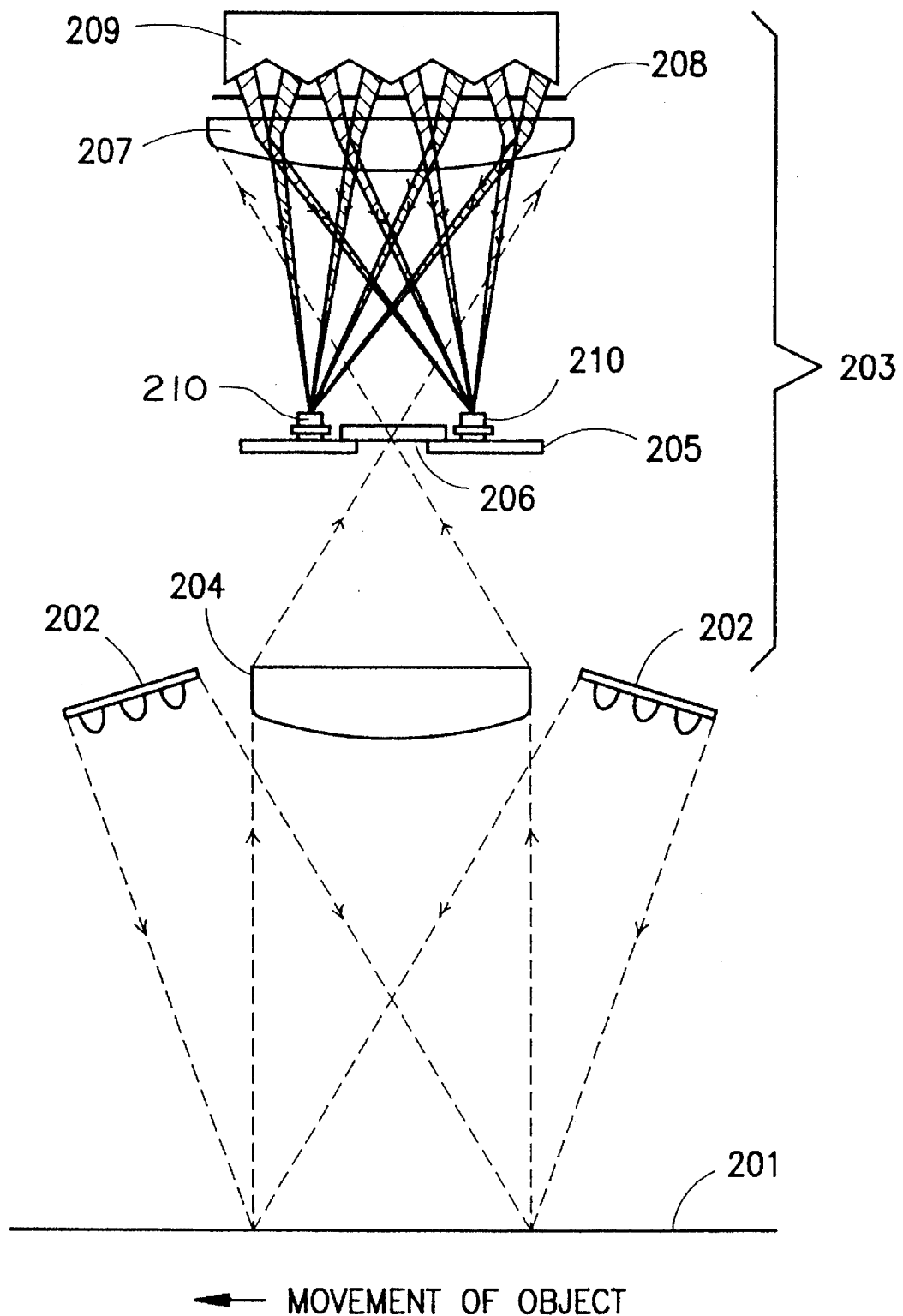
FIG. 14 is a cross-sectional view of the same device.

The light emitted by light sources 202 is reflected by object 201, which is moving relative to the light sources along the path indicated by the arrow in FIG. 14. The lens 204, aperture stop 205, optical filter 206 and the second lens 207 select only the component of the reflected light which is parallel to the optical axis. The parallel light is then restricted by the slit array 208, and is emitted to the mirror array 209. On the mirror array 209, the light is reflected and split into two beams. The two beams are then condensed by the second lens 207, and then strike the two corresponding photodetectors 210. By taking the difference between the outputs from the two photodetectors 210, the speed of the object 201 can be determined.

Figure 15A:
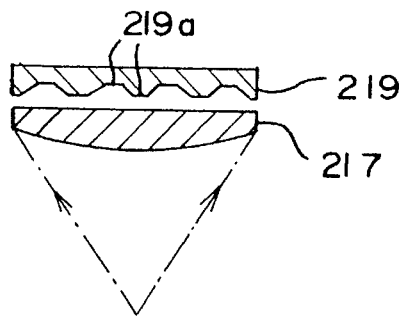
FIG. 15(a) is a cross-sectional view presented as an eleventh preferred embodiment of the present invention, and 15(b) is an enlarged cross-sectional view of the same device.
Figure 15B:
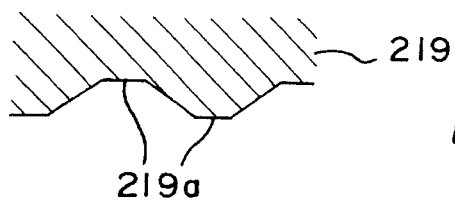
Figure 16:
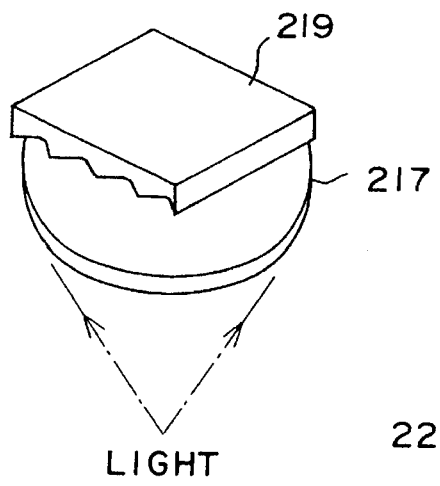
FIG. 16 is an oblique view of same device.

An eleventh preferred embodiment of the device according to the present invention will now be described with reference to FIGS. 15 and 16. This mirror array has flat portions at the top and the bottom portions (219*a*) of the reflection face. The light reflected on the flat portions (219*a*) do not reach to the two photodetectors, and functions the same as the slit array 208 in the embodiment shown in FIG. 14. The elimination of the slit array will improve the cost of the optical system.

Figure 17:
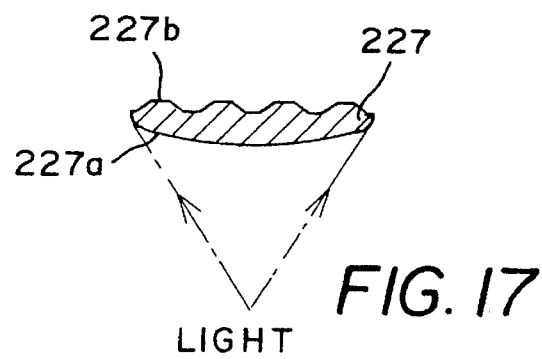
FIG. 17 is a cross-sectional view present as a twelfth preferred embodiment of the present invention.
Figure 18:
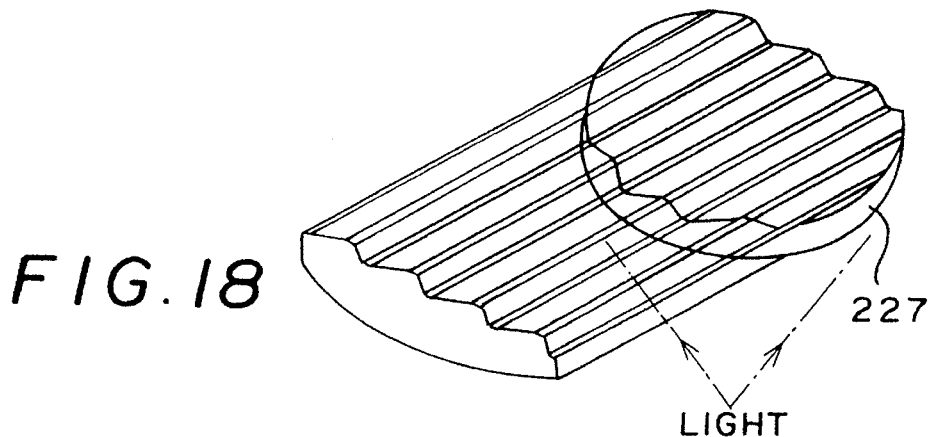
FIG. 18 is an enlarged cross-sectional view of the same device.

A twelfth embodiment of the device according to the present invention will now be described with reference to FIGS. 17 and 18. According to this embodiment, the second lens 217 and mirror array 219 are constructed in a single unit 227. The lower face 227*a* shown in FIG. 17 parallels the light from the light source to emit the parallel light to the mirror face of upper face 227*b*. The light reflected on the mirror face is then split into two paths to strike the two photodetectors, respectively. This will simplify the optical system, and improve the cost. The mirror face (refractive surfaces 227*b*) can be created by applying a metal flash to the lens 227.

Figure 19:
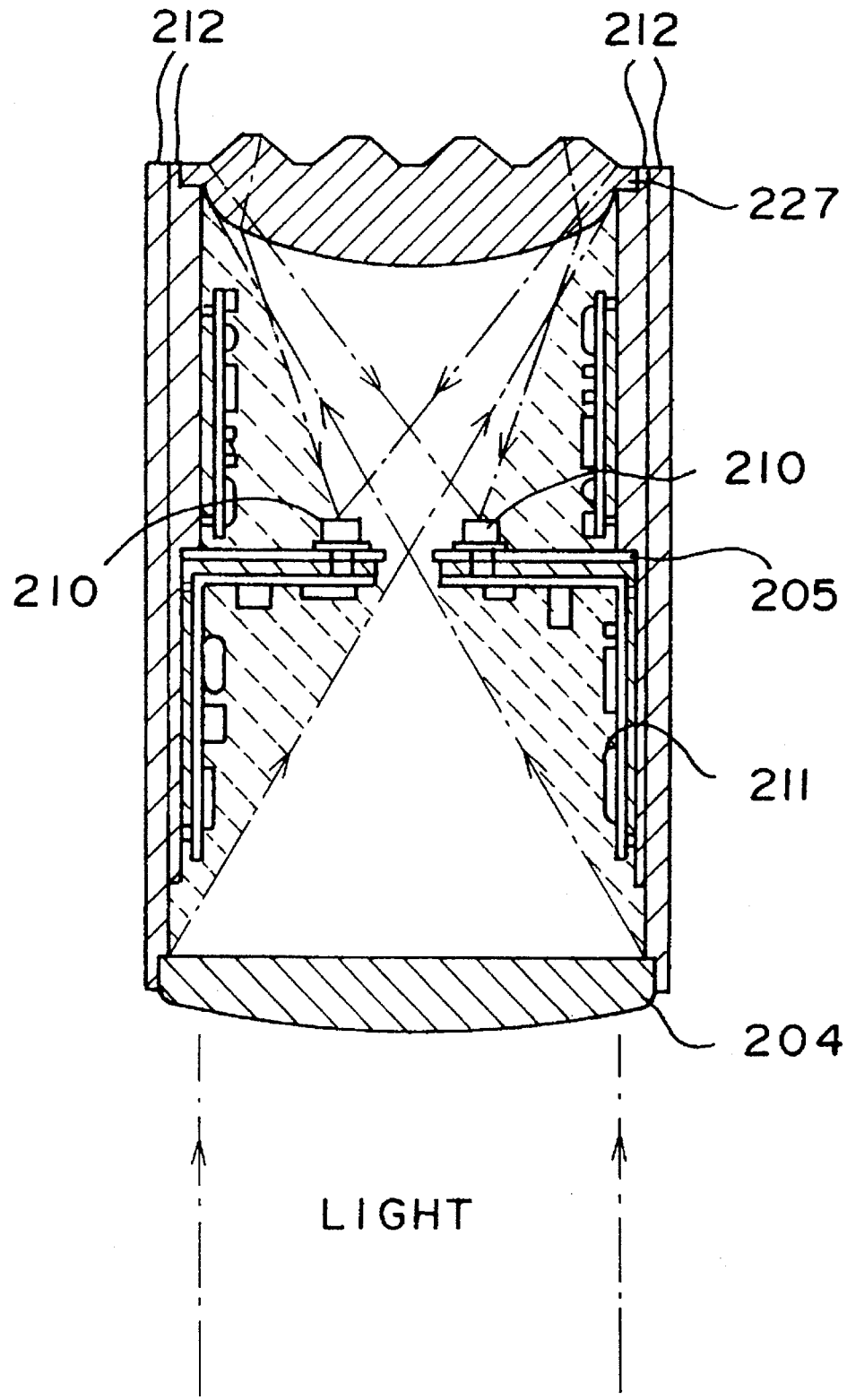
FIG. 19 is a cross-sectional view presented as a thirteenth preferred embodiment of the present invention showing where the printed circuit boards are positioned in the cabinet.

A thirteenth preferred embodiment will now be described with reference to FIG. 19. This embodiment comprises PCB board 211 to process and control this optical device for measuring speed, a first lens 204, a second lens 227 with refractive surface, a cabinet 212, a photodetector 210, and an aperture stop 205. The PCB board 211 is positioned in the space shown by broken line, where no intercept of the light will occur. This configuration enables the PCB board 211 to be placed in the cabinet 212, therefore it is not necessary to position the PCB board outside the device allowing for a compact device.

Figure 20:
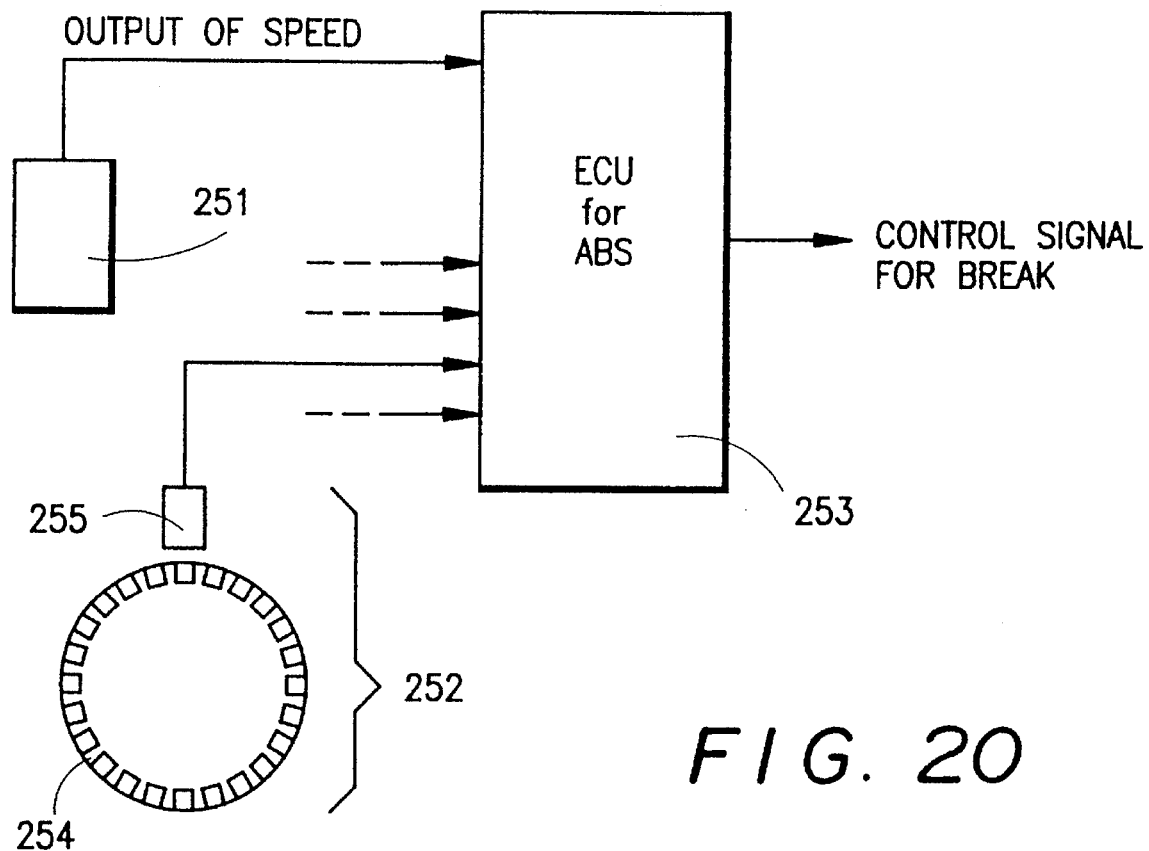
FIG. 20 is a block diagram present as a fourteenth preferred embodiment of the present invention for an anti-block system using the spatial filter.

A fourteenth preferred embodiment of the present invention will now be described with reference to FIG. 20. This embodiment is directed to an anti-lock brake system (ABS) comprising a spatial filter-type device 251 to measure speed and a wheel rotation speed sensor 252. The outputs from the spatial filter and the wheel rotation speed sensor are inputted to ECU 253. The wheel rotation speed sensor 252 comprising a magnetic rotor equipped on the wheel (teeth form) and sensor 255. The ECU 253 will calculate both inputs, and output a proper control signal for braking.

Figure 21:
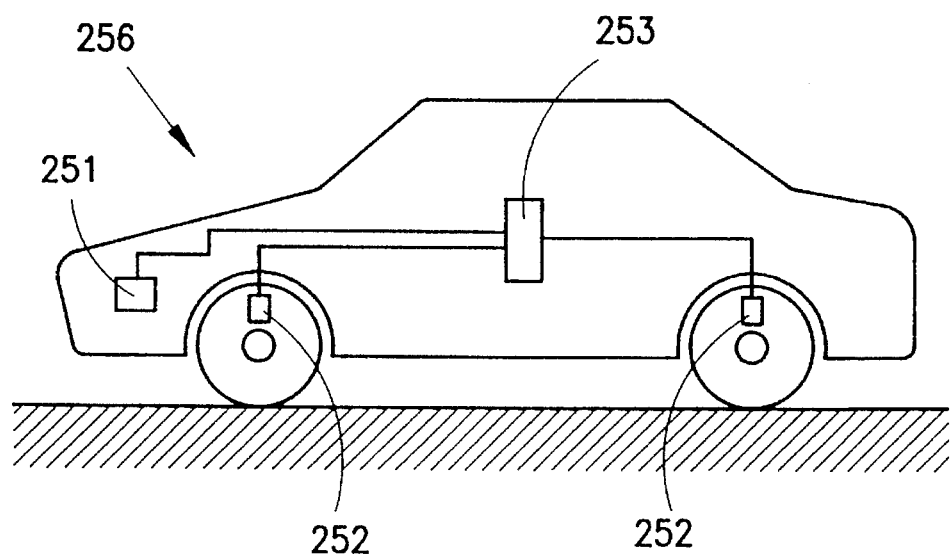
FIG. 21 is a block diagram of an automobile equipped with same device.

FIG. 21 shows an automobile 256 equipped with the ABS described above with a traction control system ("TCS") for acceleration control using a spatial filter-type device 251 and wheel rotation speed sensor 252. This system enables better braking and acceleration capability for improving the safety of automobiles.

As has been explained, a device according to the present invention allows the light reflected by an object to be condensed efficiently so that photodetectors with a smaller area can be used, the response to detection will be quick, and polarized light can easily be handled. Since common photodiodes can be used as photoreceptors, the cost of the device will be low. The fact that the photodetectors have a quick response means that the range of detectable speeds can be extended, and faster speeds can be detected.

One preferred embodiment of the device according to the present invention causes the light to be collimated before it strikes the optical element. This eliminates scattering and ensures that the light can be used efficiently.

Another preferred embodiment of the device according to the present invention allows the light reflected by the object to strike the optical element as an image. This ensures that the light can be condensed efficiently and allows the size of the receptive area of the photodetector to be reduced.

A further preferred embodiment of the device according to the present invention allows the light to be condensed easily and improves the efficiency with which the light is used.

Another preferred embodiment of the device according to the present invention allows distortion of the image of the object formed on the photodetector to be kept to a minimum. The attainable output of the spatial filter is based on the difference in the brightness of the two images, that is, the difference in the intensity of the beams separated by the spatial filter. This device allows the difference to be maximized and simplifies signal processing. Because the slit aperture is made relatively narrow and the receptive area of the photodetector on which the image is to be formed is relatively small, the response time is good. Thus, inexpensive photodetectors can be used.

In another preferred embodiment, the device minimizes the influence of stray light to yield a superior SN ratio. It allows the path of projection to be set so that the projected light is maximally condensed on the object. This ensures that the quantity of light received will vary minimally with variation of the distance between the object and the measuring device.

In a further embodiment, the aperture stop is defined by a narrow slit. This allows a small optical filter to be used on the downstream side of the stop, thereby reducing the cost.

In another embodiment, the device uses a light receiving lens with a minimal loss in received light. When the device is used to measure the speed of a submerged object, light reflected directly off the surface of the water which passes through the light receiving lens will be intercepted by the slit aperture so that it does not reach the photodetectors. This prevents mistaken detection of the water surface. Even if waves on the surface cause direct reflection in various directions, most of the reflected light will still be intercepted, and the surface will not be detected. At the same time, this device is substantially smaller than examples of the prior art devices.

In a further preferred embodiment, the beams exiting the prism array are parallel so that they can be condensed easily. If the component of the light which is condensed by mirrors is also included, the device can be seen to be highly efficient in its use of light.

In another embodiment, the device allows the reflective loss at the refractive surfaces to be nearly zero, which contributes to a highly efficient use of light.

In a further embodiment, the device minimizes the loss in received light, allowing a more favorable SN ratio.

In another embodiment, the device prevents the third order component of the spatial frequency from becoming higher harmonic noise and thereby contributes to a more favorable SN ratio.

In a further embodiment, the device minimizes the loss in received light, allowing a more favorable SN ratio.

In another embodiment, the device allows the prism array to be molded as a single piece, thereby simplifying and reducing the cost of the manufacturing process and improving accuracy.

As was discussed above, the aperture stops are located in front of the photodetectors that receive the reflected light, which has passed through the spatial filter. These aperture stops block the noise component and so allow smaller photodetectors to be used. The device can handle rapidly modulated light and is highly resistant to stray light. Because the focal points of the first and second sets of lenses coincide, the image magnification of the optical system is determined by the ratio of the focal lengths of the two sets of lenses. Thus, the spatial frequency which we wish to measure is determined unmistakably by the focal lengths of the first two sets of lenses and the period of the prism array. In addition, this device detects only the component of the light which is virtually parallel to the path of the object, and the image magnification does not vary. Even if the distance between the device and an object on the road may vary, the quantity of light received will be virtually unchanged, resulting in a light load on the signal processing circuit.

In another embodiment, the aperture stops are narrow in the dimension corresponding to the path of the object and wide in the orthogonal dimension. This ensures that most of the light passing through the aperture stop will be the component which is virtually parallel to the path of the object. The noise component is blocked to improve the accuracy of measurement. Since the orthogonal dimension is wide, a larger quantity of signal will be detected from that dimension. This makes it unnecessary to use an extremely sensitive photodetector which can detect a weak optical signal and so keeps the cost down.

Another embodiment has a panel with aperture stops which is formed from a single metal plate. This panel can be grounded to a printed wiring board so as to obtain an electrical shielding effect. This enhances the S/N ratio of the electrical signal.

A further embodiment has a panel with an aperture stop between the first two sets of lenses. This prevents any stray light components of the two beams split by prism array 5 from striking more than one of the photodetectors 9. This reduces the demand on the signal processing circuit.

What is claimed is:

1. A spatial filter-type device to measure speed, comprising:

means for projecting a beam of light on an object whose speed is to be measured;

a lens to receive light reflected by the object;

an optical element having a fixed pitch to split the light reflected by the object alternately into at least two separate light beams along at least two different paths, which have a fixed pitch with respect to an optical axis;

an aperture stop provided between said lens and said optical element, and located at a focal position of said lens so that light reflected by the object that passes through said aperture stop is directed to said optical element;

at least two photodetectors to receive respective light beams; and a panel having at least two aperture stops, said aperture stops each positioned in front of each photodetector.

2. A device according to claim 1, including a collimating lens located between said aperture stop and said optical element to collimate the reflected light which passes through the said aperture stop so that it will strike said optical element.

3. A device according to claim 2, wherein said optical element is placed in a plane where an image of the object is formed with the aid of the reflected light receiving lens and the collimating lens.

4. A device according to claim 1, including a condenser positioned between said optical element and said two photodetectors so that the reflected light which has been split alternately into at least two separate light beams along at least two different paths at a fixed pitch with respect to the optical path by said optical element is condensed onto said two photodetectors by said condenser.

5. A device according to claim 2, including a condenser positioned between said optical element and said two photodetectors so that the reflected light which has been split alternately into at least two separate light beams along at least two different paths at a fixed pitch with respect to the optical path by said optical element is condensed onto said two photodetectors by said condenser.

6. A device according to claim 3, including a condenser positioned between said optical element and said two photodetectors so that the reflected light which has been split alternately into at least two separate light beams along at least two different paths at a fixed pitch with respect to the optical path by said optical element is condensed onto said two photodetectors by said condenser.

7. A device according to claim 4, wherein said condenser has a shorter focal length than said collimating lens.

8. A device according to claim 5, wherein said condenser has a shorter focal length than said collimating lens.

9. A device according to claim 6, wherein said condenser has a shorter focal length than said collimating lens.

10. A device according to claim 1, wherein said means for projecting a light beam is defined by a number of infrared light emitting diodes of a type designed for pulse modulation.

11. A device according to claim 1, wherein said aperture stop is defined by a slit oriented transverse relative to a direction of movement of the object.

12. A device according to claim 11, wherein said means for projecting a light beam is defined by a number of infrared light emitting diodes of a type designed for pulse modulation.

13. A device according to claim 1, wherein said means for projecting a light beam is placed along a relative path of movement of the object on either side of said reflected light receiving lens.

14. A device according to claim 13, wherein said means for projecting a light beam is defined by a number of infrared light emitting diodes of a type designed for pulse modulation.

15. A device according to claim 13, wherein said aperture stop is defined by a slit oriented transverse relative to a direction of movement of the object.

16. A device according to claim 14, wherein said aperture stop is defined by a slit oriented transverse relative to a direction of movement of the object.

17. A device according to claim 1, wherein said optical element is defined by a prism array lined up alternately at a fixed pitch so that the light emitted by light emitting surfaces of said prism array travel along different paths which are different from the original path of the reflected light.

18. A device according to claim 17, wherein said means for projecting a light beam is defined by a number of infrared light emitting diodes of a type designed for pulse modulation.

19. A device according to claim 17, wherein said aperture stop is defined by a slit oriented transverse relative to a direction of movement of the object.

20. A device according to claim 18, wherein said aperture stop is defined by a slit oriented transverse relative to a direction of movement of the object.

21. A device according to claim 17, wherein said means for projecting a light beam is placed along a relative path of movement of the object on either side of said reflected light receiving lens.

22. A device according to claim 18, wherein said means for projecting a light beam is placed along a relative path of movement of the object on either side of said reflected light receiving lens.

23. A device according to claim 19, wherein said means for projecting a light beam is placed along a relative path of movement of the object on either side of said reflected light receiving lens.

24. A device according to claim 20, wherein said means for projecting a light beam is placed along a relative path of movement of the object on either side of said reflected light receiving lens.

25. A device according to claim 17, wherein said prism array is so arranged that angles formed by optical axes of said light emitting surfaces with respect to incident reflected light are at the Brewster angle.

26. A device according to claim 17, wherein at least one of said light emitting surfaces of said prism array struck by the incident reflected light and surfaces from which said at least two separate light beams exit are covered with a non-reflective coating.

27. A device according to claim 17, wherein at least one of said light emitting surfaces of said prism array struck by the incident reflected light and surfaces from which said at least two separate light beams are emitted have a mechanism to restrict aperture in such a way that the ratio of aperture period to width is 3:1.

28. A device according to claim 25, wherein at least one of said light emitting surface of said prism array struck by the incident reflected light and surfaces from which said at least two separate light beams are emitted have a mechanism to restrict aperture in such a way that the ratio of aperture period to width is 3:1.

29. A device according to claim 26, wherein at least one of said light emitting surface of said prism array struck by the incident reflected light and surfaces from which said at least two separate light beams are emitted have a mechanism to restrict aperture in such a way that the ratio of aperture period to width is 3:1.

30. A device according to claim 17, wherein said prism array includes a device to obstruct the light between every two of said light emitting surfaces from which said at least two separate light beams are emitted along at least two different paths different from the original path of the incident reflected light.

31. A device according to claim 17, wherein said prism array is made from a single piece of material.

32. A device for measuring the speed of an object, comprising:

- a luminous element for projecting a light beam on the object;
- an aperture stop receiving reflected light reflected by the object;
- a light condensing lens located on one side of said aperture stop between the object and said aperture stop for focusing the reflected light through said aperture stop;
- a spatial filter located on an opposite side of said aperture stop for receiving the reflected light, said spatial filter including an optical element having a fixed pitch to split the light reflected by the object alternatively into at least two separate light beams along at least two different paths, which have a fixed pitch with respect to an optical axis;
- a collimating lens located between said aperture stop and said spatial filter for directing the reflected light to said spatial filter;
- a light slit array connected to said spatial filter;
- a pair of photodetectors positioned for receiving light emitted from said spatial filter;
- a panel having a pair of aperture stops, said aperture stops each positioned in front of each photodetector; and
- output means for comparing output signals from said pair of photodetectors and generating a signal indicating speed.

33. A device according to claim 32, wherein said collimating lens includes two sets of lenses, which are positioned so that their focal points coincide.

34. A device according to claim 32, wherein said light slit array is located between said spatial filter and said pair of photodetectors.

35. A device according to claim 32, wherein said light slit array is provided with a plurality of perpendicular partitions received within a plurality of depressions in said spatial filter.

36. A device according to claim 34, wherein said aperture stops of said panel are narrow with respect to a path of movement of the object, but wide along a transverse axis.

37. A device according to claim 34, wherein said panel with said pair of aperture stops is formed from a single plate of metal, which is fastened to a printed circuit board on which the said photodetectors are fixed and wired.

38. A device according to claim 34, wherein said aperture stops of said panel are narrow with respect to a path of movement of the object, but wide along a transverse axis.

39. A spatial filter-type device to measure speed, comprising:

- a light source to emit light onto an object whose speed is to be measured;
- a light condensing lens to receive the reflected light from the object;
- an aperture stop positioned at the focal point of said condensing lens;
- a mirror array for receiving the light reflected by the object and splitting the light into two separate light beams, said mirror array having a reflection face with flat top portions
- a collimating lens to make parallel reflected light passed through said aperture stop and received by said mirror array;
- a pair of photodetectors to respectively receive the two separate light beams emitted from said mirror array; and
- a panel having at least two aperture stops, said aperture stops each positioned in front of each photodetector.

40. A device according to claim 39, wherein said aperture stops of said panel are narrow with respect to a path of movement of the object, but wide along a transverse axis.

41. A device according to claim 39, wherein said mirror array has triangular faces in one direction, each triangular face having a flat portion on a top and bottom, and said triangle faces in another direction have the same form side by side.

42. A device according to claim 40, wherein said collimating lens and said mirror array form a face to receive and make parallel the reflected light from the object, and collimate the reflected light on the mirror array, and form another face.

43. A device according to claim 42, wherein said collimating lens and said mirror array are formed and manufactured as a single unit, and the mirror face of said mirror array is provided by applying metal flash to the face.

44. A device according to claim 39, wherein said mirror face of said mirror array is applied with a surface coating, which can amplify a specific wavelength of light that strikes said photodetectors.

45. A device according to claim 40, where said two photodetectors are positioned close to each other at positions within the device where no light intercept occurs.

46. A device according to claim 40, further comprising a housing and printed circuit board for controlling the device, said printed circuit board in position within the device at a position where no light intercept occurs.

47. A device according to claim 39, wherein the device is provided to control the speed of an automobile fitted with the device.

48. An automobile fitted with device according to claim 39.

* * * * *